United States Patent
Ikari

(10) Patent No.: US 11,242,426 B2
(45) Date of Patent: Feb. 8, 2022

(54) CURABLE COMPOSITION

(71) Applicant: KANEKA CORPORATION, Osaka (JP)

(72) Inventor: Yoshihiro Ikari, Osaka (JP)

(73) Assignee: KANEKA CORPORATION, Osaka (JP)

( * ) Notice: Subject to any disclaimer, the term of this patent is extended or adjusted under 35 U.S.C. 154(b) by 161 days.

(21) Appl. No.: 16/548,013

(22) Filed: Aug. 22, 2019

(65) Prior Publication Data

US 2019/0375876 A1    Dec. 12, 2019

Related U.S. Application Data

(63) Continuation of application No. PCT/JP2018/005858, filed on Feb. 20, 2018.

(30) Foreign Application Priority Data

Feb. 22, 2017  (JP) .............................. JP2017-030566

(51) Int. Cl.
*C08F 299/00*    (2006.01)

(52) U.S. Cl.
CPC ...... *C08F 299/00* (2013.01); *C08L 2205/025* (2013.01)

(58) Field of Classification Search
CPC ...... C08F 8/00; C08F 299/00; C08F 2810/40; C08F 2810/30; C08L 2205/025
See application file for complete search history.

(56) References Cited

U.S. PATENT DOCUMENTS

2014/0243444 A1    8/2014  Ikari et al.
2017/0051093 A1    2/2017  Ikari et al.

FOREIGN PATENT DOCUMENTS

| JP | 2011178955 A | 9/2011 |
| JP | 2011236363 A | 11/2011 |
| JP | 2011236364 A | 11/2011 |
| JP | 2012102243 A | 5/2012 |
| JP | 2013035901 A | 2/2013 |
| JP | 2013216782 A | 10/2013 |
| WO | 2013047314 A1 | 4/2013 |

OTHER PUBLICATIONS

International Search Report issued in corresponding International Application No. PCT/JP2018/005858; dated May 15, 2018 (2 pages).
Written Opinion of the International Searching Authority issued in corresponding International Application No. PCT/JP2018/005858; dated May 15, 2018 (7 pages).

*Primary Examiner* — Sanza L. McClendon
(74) *Attorney, Agent, or Firm* — Osha Bergman Watanabe & Burton LLP

(57) ABSTRACT

A curable composition may include 100 parts by weight of a polyisobutylene-based polymer (A) having 1.2 or more (meth)acryloyl groups per molecule, 15 to 900 parts by weight of a polyisobutylene-based polymer (B) having 0.5 to 1.0 (meth)acryloyl group per molecule, and 0.001 to 50 parts by weight, per 100 parts by weight of the total weight of the polymer (A) and the polymer (B), of a polymerization initiator (C). Each of the polymer (A) and the polymer (B) may have a number average molecular weight of 500 to 500,000 as measured by size exclusion chromatography based on polystyrene standards, and a molecular weight distribution (weight-average molecular weight Mw)/(number-average molecular weight Mn) of 1.0 to 2.0.

11 Claims, No Drawings

CURABLE COMPOSITION

TECHNICAL FIELD

One or more embodiments of the present invention relate to a curable composition containing a polyisobutylene-based polymer having a (meth)acryloyl group.

BACKGROUND

The techniques to crosslink a resin with active energy rays such as UV (ultraviolet rays) and EB (electron beam) are widely recognized. Situations in which such techniques are utilized instead of conventional curing reactions triggered by heat have been increasing.

The features of the active energy ray curing techniques include solvent-free system, energy saving, space saving, and shortening of process time in the curing process as compared to thermal curing techniques. In addition, greater functionality of a cured product is easily achieved due to capability of irradiating a substrate having a complicated shape with light. These techniques are suitably used in applications such as inks, paints, adhesives, sealing materials, precision components for electrical and electronic applications, and molded articles.

Examples of the main properties required for materials used in the above fields include durability, heat resistance, weather resistance, water resistance, and gas barrier properties, and an example of a resin having such characteristics is a polyisobutylene-based polymer.

Patent Literature 1 and 2 each disclose an active energy ray-curable composition based on a polyisobutylene-based polymer having a (meth)acryloyl group. However, in order to obtain a curable composition having various distinctive features as an elastomeric material, there is room for further study.

Patent Literature 3 discloses a curable composition that contains polymers each having a reactive silicon group at each end or one end of the polymer and that is cured by a hydrolysis condensation reaction. According to this, there is disclosed a technique for imparting flexibility, durability, and low staining properties to a curable composition comprising a polymer obtained by ring-opening addition polymerization of alkylene oxide, but the technique belongs to curing techniques different from the active energy ray curing techniques. Also, the main chain of each polymer is different from that of a polyisobutylene-based polymer. Furthermore, there is no disclosure of other physical properties required for the curable composition.

Patent Literature 4 and 5 each disclose a technique for making a curable composition have a high elongation or imparting vibration damping properties to the curable composition by using (meth)acrylic-based polymers each having a reactive silicon group at each end or one end of the polymer. However, the polymers having reactive silicon groups are cured by a hydrolysis condensation reaction and are not cured by active energy rays. The main chain of each polymer is a (meth)acrylic-based polymer, which is different from a polyisobutylene-based polymer. Patent Literature 4 and 5 are different in the technical field from the technique regarding an active energy ray-curable type curable composition containing a polyisobutylene-based polymer. Thus, for an active energy ray-curable-type curable composition containing a polyisobutylene-based polymer, independent study needs to be carried out.

PATENT DOCUMENTS

[PTL 1] WO 2013/047314
[PTL 2] Japanese Laid-Open Patent Publication No. 2013-216782
[PTL 3] Japanese Laid-Open Patent Publication No. 2011-178955
[PTL 4] Japanese Laid-Open Patent Publication No. 2011-236363
[PTL 5] Japanese Laid-Open Patent Publication No. 2011-236364

Generally, a polyisobutylene-based polymer is known as a material having excellent flexibility, gas barrier properties, and vibration damping properties. However, for example, when a plasticizer component is blended in order to achieve further flexibility, a decrease in gas barrier properties, gel content, and breaking strength of a cured product and bleed-out of the plasticizer component in long-term use have been observed in some cases. Therefore, there has been a demand for a technique for improvement without impairing these physical properties.

In addition, a polyisobutylene-based polymer is suitably used as a base polymer for various sealing materials, etc. However, in order to maintain physical properties over a long period of time, the polymer preferably slowly follows deformation of a sealing portion or the like while relaxing stress. This is because, in the case of a high-modulus cured product that causes rapid deformation, material failure of the sealing material may occur during deformation, making it difficult to maintain sealing performance.

Therefore, when using a polyisobutylene-based polymer as a sealing material, the polyisobutylene-based polymer is required to be sufficiently flexible in order to follow deformation. However, as described above, it has been difficult to achieve both flexibility and other physical properties of the rubber material at desired levels. Thus, there has been a demand for a technique regarding a highly flexible rubber material that can maintain sealing performance over a long period of time.

From the above background, there has been room for further improvement in the development of a compounding technique for a curable composition having various distinctive features as a rubber material.

SUMMARY

One or more embodiments of the present invention provide a curable composition that has excellent flexibility, strength, gas barrier properties, and vibration damping properties, that causes no bleed-out of a compounding agent component, and that has excellent followability to deformation. More preferably, one or more embodiments of the present invention provide a curable composition that can impart flexibility while inhibiting a decrease in strength and that causes no bleed-out of a compounding agent component and has excellent followability to deformation while maintaining gas barrier properties.

The present inventor has performed extensive studies on a curable composition containing 15 to 900 parts by weight of a polyisobutylene-based polymer (B) having 0.5 to 1.0 (meth)acryloyl group within one molecule per 100 parts by weight of a polyisobutylene-based polymer (A) having 1.2 or more (meth)acryloyl groups within one molecule, and 0.001 to 50 parts by weight of a polymerization initiator (C) per 100 parts by weight of the total weight of the polymer (A) and the polymer (B), wherein the molecular weights of the polymer (A) and the polymer (B) are each 500 to 500,000 as a number-average molecular weight measured by size exclusion chromatography based on polystyrene standards, and the polymer (A) and the polymer (B) each have a molecular weight distribution (a value represented by (weight-average molecular weight Mw)/(number-average molecular weight Mn)) of 1.0 to 2.0. As used herein, the term "within one molecule" means "per molecule" and "on an average in one molecule".

That is, one or more embodiments of the present invention include:

(1) A curable composition containing 15 to 900 parts by weight of a polyisobutylene-based polymer (B) having 0.5 to 1.0 (meth)acryloyl group within one molecule per 100 parts by weight of a polyisobutylene-based polymer (A) having 1.2 or more (meth)acryloyl groups within one molecule, and 0.001 to 50 parts by weight of a polymerization initiator (C) per 100 parts by weight of the total weight of the polymer (A) and the polymer (B), wherein the molecular weights of the polymer (A) and the polymer (B) are each 500 to 500,000 as a number-average molecular weight measured by size exclusion chromatography based on polystyrene standards, and the polymer (A) and the polymer (B) each have a molecular weight distribution (weight-average molecular weight Mw)/(number-average molecular weight Mn) of 1.0 to 2.0.

(2) The curable composition, wherein the polymer (A) has (meth)acryloyl groups at ends of a polymer chain thereof.

(3) The curable composition, wherein the polymer (B) has a (meth)acryloyl group at one end of a polymer chain thereof.

(4) The curable composition, wherein the polymer (A) includes a polymer of the following general formula (1), and the polymer (B) includes a polymer of the following general formula (2),

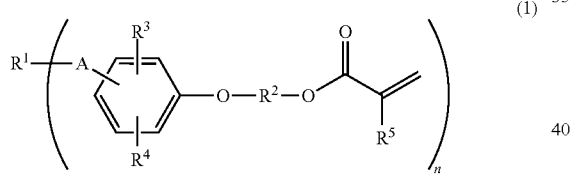

wherein $R^1$ represents a divalent or higher-valent aromatic hydrocarbon group or an aliphatic hydrocarbon group, A represents a polyisobutylene-based polymer, $R^2$ represents a divalent saturated hydrocarbon group having 2 to 6 carbon atoms and containing no hetero atoms, $R^3$ and $R^4$ each represent hydrogen, a monovalent hydrocarbon group having 1 to 20 carbon atoms, or an alkoxy group, $R^5$ represents hydrogen or a methyl group, and n represents an integer of 2 or greater,

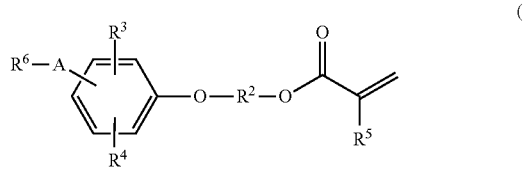

wherein $R^6$ represents a monovalent aromatic hydrocarbon group or an aliphatic hydrocarbon group, A represents a polyisobutylene-based polymer, $R^2$ represents a divalent saturated hydrocarbon group having 2 to 6 carbon atoms and having no hetero atoms, $R^3$ and $R^4$ each represent hydrogen, a monovalent hydrocarbon group having 1 to 20 carbon atoms, or an alkoxy group, and $R^5$ represents hydrogen or a methyl group.

(5) The curable composition, wherein $R^2$ of the polymer (A) is a divalent saturated hydrocarbon group selected from the group consisting of —$CH_2CH_2$—, —$CH_2CH_2CH_2$—, and —$CH_2CH_2CH_2CH_2$—.

(6) The curable composition, wherein $R^2$ of the polymer (B) is a divalent saturated hydrocarbon group selected from the group consisting of —$CH_2CH_2$—, —$CH_2CH_2CH_2$—, and —$CH_2CH_2CH_2CH_2$—.

(7) The curable composition, wherein $R^3$s and $R^4$s in the polymer (A) and the polymer (B) each represent hydrogen.

(8) The curable composition, wherein n in the polymer (A) is 2.

(9) The curable composition, wherein the polymerization initiator (C) is a radical polymerization initiator or an anionic polymerization initiator.

(10) The curable composition, wherein the polymerization initiator (C) is a photo radical polymerization initiator capable of generating a radical species by light.

(11) A cured product obtained by radical curing of the curable composition with active energy rays.

According to the curable composition of one or more embodiments of the present invention, it is possible to obtain a curable composition that has excellent flexibility, strength, gas barrier properties, and vibration damping properties, that causes no bleed-out of a compounding agent component, and that has excellent followability to deformation. Preferably, it is possible to obtain a curable composition that can impart flexibility while inhibiting a decrease in strength and that causes no bleed-out of a compounding agent component and has excellent followability to deformation while maintaining gas barrier properties.

DETAILED DESCRIPTION OF THE EMBODIMENTS

One or more embodiments of the present invention is a curable composition containing 15 to 900 parts by weight of a polyisobutylene-based polymer (B) (hereinafter, sometimes referred to as polymer (B)) having 0.5 to 1.0 (meth)acryloyl group within one molecule per 100 parts by weight of a polyisobutylene-based polymer (A) (hereinafter, sometimes referred to as polymer (A)) having 1.2 or more (meth)acryloyl groups within one molecule, and 0.001 to 50 parts by weight of a polymerization initiator (C) per 100 parts by weight of the total weight of the polymer (A) and the polymer (B), wherein the molecular weights of the polymer (A) and the polymer (B) are each 500 to 500,000 as a number-average molecular weight measured by size exclusion chromatography based on polystyrene standards, and the polymer (A) and the polymer (B) each have a molecular weight distribution, (weight-average molecular weight Mw)/(number-average molecular weight Mn), of 1.0 to 2.0.

The polymer (A) of one or more embodiments of the present invention provides crosslinking points to a cured product obtained by curing the composition of the present invention, and is an essential component for imparting rubber elasticity.

The positions of the (meth)acryloyl groups in the polymer (A) of one or more embodiments of the present invention are not particularly limited, and the polymer (A) may have a (meth)acryloyl group at polymer end(s), or may have a (meth)acryloyl group at any position in the polymer chain. However, from the viewpoint of obtaining a polymer having a clear structure and easily adjusting physical properties of a cured product, the polymer (A) preferably has a (meth)acryloyl group at polymer end(s).

The number of (meth)acryloyl groups per molecule in the polymer (A) of one or more embodiments of the present invention is not particularly limited as long as the number is not less than 1.2. However, from the viewpoint of physical properties, quick curing, and productivity of the obtained cured product, the number of (meth)acryloyl groups is preferably not less than 1.5 and more preferably not less than 1.7. Regarding the upper limit of the number of (meth)acryloyl groups per molecule in the polymer (A), in consideration of availability of the polymerization initiator, the number of (meth)acryloyl groups is, for example, not greater than 5.0, preferably not greater than 4.0, more preferably not greater than 3.0, further preferably not greater than 2.5, and particularly preferably not greater than 2.0.

The structure of the polymer (A) of one or more embodiments of the present invention is not particularly limited. However, from the viewpoint of availability of raw materials, ease of production, economic efficiency, and physical properties of the obtained cured product, one or more polymers selected from the group consisting of polymers represented by the following general formulas (1) and (3) to (6) are preferably included, and the polymer represented by general formula (1) is more preferably included.

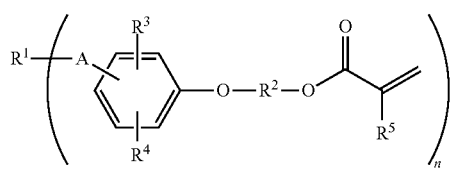

(1)

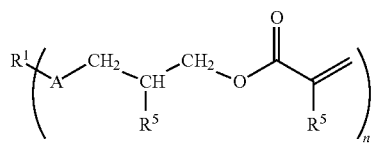

(3)

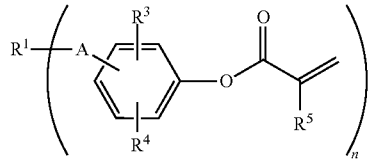

(4)

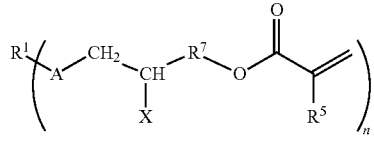

(5)

(6)

($R^1$ represents a divalent or higher-valent aromatic hydrocarbon group or an aliphatic hydrocarbon group, A represents a polyisobutylene-based polymer, $R^2$ represents a divalent saturated hydrocarbon group having 2 to 6 carbon atoms and containing no hetero atoms, $R^3$ and $R^4$ each represent hydrogen, a monovalent hydrocarbon group having 1 to 20 carbon atoms, or an alkoxy group, $R^5$ represents hydrogen or a methyl group, $R^7$ represents a single bond or a divalent saturated hydrocarbon group having 1 to 20 carbon atoms, X represents a halogen atom, and n represents an integer of 2 or greater.)

The polymer (B) of one or more embodiments of the present invention exists as a so-called dangling chain in the cured product of one or more embodiments of the present invention, and is an essential component for exhibiting various characteristic physical properties. This makes it possible to impart vibration damping properties, heat resistance, and followability to deformation, to the cured product without impairing the rubber physical properties and the gas barrier properties.

The positions of the (meth)acryloyl groups in the polymer (B) of one or more embodiments of the present invention are not particularly limited, and the polymer (B) may have a (meth)acryloyl group at polymer end(s), or may have a (meth)acryloyl group at any position in the polymer chain. However, from the viewpoint of obtaining a polymer having a clear structure and easily adjusting physical properties of a cured product, the polymer (B) preferably has a (meth) acryloyl group at one polymer end.

The number of (meth)acryloyl groups per molecule in the polymer (B) of one or more embodiments of the present invention is not particularly limited as long as the number falls within the range of 0.5 to 1.0. However, from the viewpoint of physical properties of the obtained cured product, the number of (meth)acryloyl groups is preferably within the range of 0.7 to 1.0 and further preferably within the range of 0.8 to 1.0.

The structure of the polymer (B) of one or more embodiments of the present invention is not particularly limited. However, from the viewpoint of availability of raw materials, ease of production, economic efficiency and physical properties of the obtained cured product, one or more polymers selected from the group consisting of polymers represented by the following general formulas (2) and (7) to (10) are preferably included, and the polymer represented by general formula (2) is more preferably included.

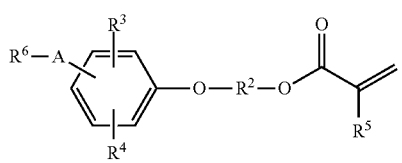

(2)

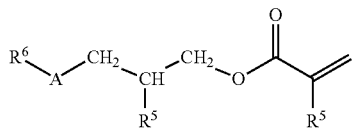

(7)

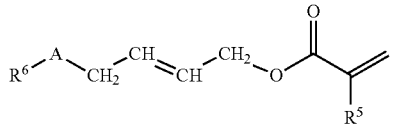

(8)

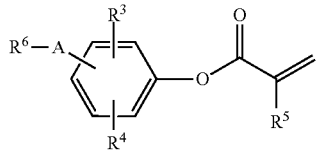

(9)

-continued

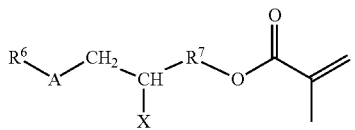
(10)

($R^6$ represents a monovalent aromatic hydrocarbon group or an aliphatic hydrocarbon group, A represents a polyisobutylene-based polymer, $R^2$ represents a divalent saturated hydrocarbon group having 2 to 6 carbon atoms and having no hetero atoms, $R^3$ and $R^4$ each represent hydrogen, a monovalent hydrocarbon group having 1 to 20 carbon atoms, or an alkoxy group, $R^5$ represents hydrogen or a methyl group, $R^7$ represents a single bond or a divalent saturated hydrocarbon group having 1 to 20 carbon atoms, and X represents a halogen atom.)

In the curable composition of one or more embodiments of the present invention, the polymer (B) is used in an amount of 15 to 900 parts by weight per 100 parts by weight of the polymer (A). If the amount of the polymer (B) is less than 15 parts by weight, the flexibility, the vibration damping properties, and the followability to deformation may be insufficient. Thus, it is not preferable that the amount of the polymer (B) be less than 15 parts by weight. In addition, if the amount of the polymer (B) is greater than 900 parts by weight, the strength of the cured product may be insufficient, or the tackiness of the surface of the cured product may increase, making it difficult to handle the cured product. Thus, it is not preferable that the amount of the polymer (B) be greater than 900 parts by weight.

In particular, when the curable composition of one or more embodiments of the present invention is used in applications such as electric and electronic components, resist materials, sealing materials, coating materials, adhesives, sealants, and molding components for medicines and medical supplies, sealing materials for electrolytic capacitors, and on-site forming gaskets, the polymer (B) is used in an amount of preferably 15 to 900 parts by weight, more preferably 20 to 700 parts by weight, further preferably 25 to 500 parts by weight, much further preferably 25 to 300 parts by weight, and particularly preferably 25 to 150 parts by weight, per 100 parts by weight of the polymer (A). By using the polymer (B) at this weight ratio, a curable composition, from which a cured product having excellent strength as a rubber material is obtained and that has excellent flexibility, gas barrier properties, heat resistance, vibration damping properties, and followability to deformation, is obtained.

In applications where it is necessary to follow relatively large deformation, such as vibration-proof and vibration damping materials, sealing materials for double-layered glass, covering materials and sealing materials for electric wires, cables, and optical fibers, rollers, sheets, sealing materials, adhesives, pressure-sensitive adhesives, molded articles, paints, inks, foams, and materials for tires, the polymer (B) is used in an amount of preferably 15 to 900 parts by weight, more preferably 30 to 900 parts by weight, further preferably 40 to 800 parts by weight, much further preferably 40 to 500 parts by weight, particularly preferably 80 to 400 parts by weight, and particularly preferably 150 to 300 parts by weight, per 100 parts by weight of the polymer (A). By using the polymer (B) at this weight ratio, a curable composition, from which a cured product having excellent flexibility as a rubber material is obtained and that has excellent strength as a rubber material, gas barrier properties, heat resistance, vibration damping properties, and followability to deformation, is obtained.

As the monomers that form the polyisobutylene main chains in the polymer (A) and the polymer (B) of one or more embodiments of the present invention, for example, as the monomers that are represented by symbols A in the general formula (1) and the general formula (2) and that form the polyisobutylene-based polymers, isobutylene is mainly used. Other than mainly using isobutylene, other cationically polymerizable monomers may be copolymerized as long as the advantageous effects of one or more embodiments of the present invention are not impaired.

Examples of other such cationically polymerizable monomers include olefins having 4 to 12 carbon atoms (excluding isobutylene), vinyl ethers, aromatic vinyl compounds, vinylsilanes, and allylsilanes. Specific examples of other such cationically polymerizable monomers include isoprene, amylene, 1,3-butadiene, 1-butene, 2-butene, 2-methyl-1-butene, 3-methyl-1-butene, pentene, 4-methyl-1-pentene, hexene, vinylcyclohexene, α-pinene, β-pinene, limonene, styrene, indene, α-methylstyrene, methoxystyrene, methylstyrene (including o-methylstyrene, m-methylstyrene, p-methylstyrene), trimethylstyrene, chlorostyrene, dichlorostyrene, methyl vinyl ether, ethyl vinyl ether, isobutyl vinyl ether, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, and diallyldimethylsilane.

Among them, isoprene, amylene, 1,3-butadiene, 1-butene, α-pinene, ß-pinene, limonene, styrene, indene, α-methylstyrene, methylstyrene (including o-methylstyrene, m-methylstyrene, p-methylstyrene), methyl vinyl ether, ethyl vinyl ether, and isobutyl vinyl ether are preferable from the viewpoint of copolymerizability.

In one or more embodiments where a monomer is used that is polymerizable with isobutylene, from the viewpoint of maintaining the advantageous effects of one or more embodiments of the present invention, the other monomer may be contained in the range of preferably 50% by weight or less, more preferably 30% by weight or less, and further preferably 10% by weight or less in the isobutylene-based polymer. It should be noted that in the polymer (A) (particularly, general formula (1)) and the polymer (B) (particularly, general formula (2)), the polyisobutylene-based polymers (particularly symbols A in the formulas) may be the same, or may be different from each other.

In one or more embodiments, $R^1$ in the above general formula (1) represents a divalent or higher-valent aromatic hydrocarbon group or an aliphatic hydrocarbon group. Specific examples of the aromatic hydrocarbon group include divalent or higher alkyl-substituted benzenes having a free valence (also referred to as atomic bonding, and the same applies below) at the benzylic position such as an m-dicumyl group, a p-dicumyl group, a 5-tert-butyl-1,3-dicumyl group, a 5-methyl-1,3-dicumyl group, and a 1,3,5-tricumyl group (see the following formulas wherein * represents atomic bonding). Meanwhile, specific examples of the aliphatic hydrocarbon group are preferably divalent or higher-valent alkylene groups having about 4 to 20 carbon atoms and having a free valence on tertiary carbon, such as groups represented by —(CH$_3$)$_2$CCH$_2$(CH$_3$)$_2$C— and —(CH$_3$)$_2$CCH$_2$(CH$_3$)$_2$CCH$_2$(CH$_3$)$_2$C—.

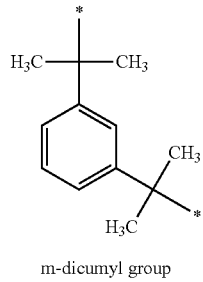

m-dicumyl group

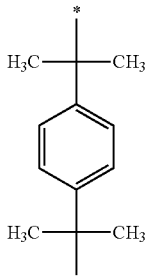

p-dicmyl group

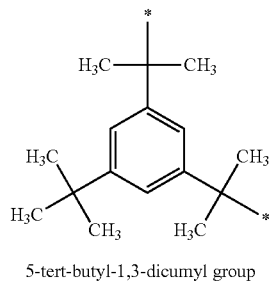

5-tert-butyl-1,3-dicumyl group

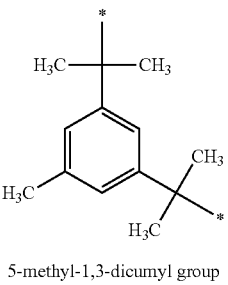

5-methyl-1,3-dicumyl group

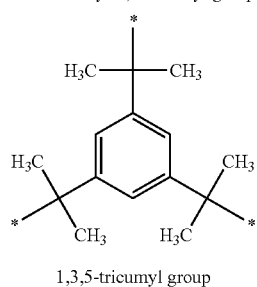

1,3,5-tricumyl group

Among them, an m-dicumyl group, a p-dicumyl group, and a 1,3,5-tricumyl group are preferable from the viewpoint of availability of raw materials and reactivity, and a p-dicumyl group is more preferable.

The polymer (B) of one or more embodiments of the present invention is preferably the polymer represented by the above general formula (2).

In one or more embodiments, $R^6$ in the above general formula (2) represents a monovalent aromatic hydrocarbon group or an aliphatic hydrocarbon group. Specific examples of the aromatic hydrocarbon group include monovalent alkyl-substituted benzenes having a free valence at the α-position of alkyl, such as a cumyl group (also referred to as 1-methyl-1-phenylethyl group), a 4-tert-butyl-cumyl group, a 4-methyl-cumyl group, a 4-methoxy-cumyl group, and a 1-phenylethyl group (a group represented by CH$_3$—CH(Ph)-). Meanwhile, specific examples of the aliphatic hydrocarbon group are preferably alkyl groups having about 4 to 20 carbon atoms and having a free valence on tertiary carbon, such as a tert-butyl group and a CH$_3$—C(CH$_3$)$_2$—CH$_2$—C(CH$_3$)$_2$— group.

Among them, a cumyl group is preferable from the viewpoint of availability of raw materials and reactivity.

$R^2$s in the above general formulas (1) and (2) each represent a divalent saturated hydrocarbon group having 2 to 6 carbon atoms and containing no hetero atoms. Specific examples of such a divalent saturated hydrocarbon group include —CH$_2$CH—, —CH$_2$CH$_2$CH$_2$—, —CH$_2$CH$_2$CH$_2$CH$_2$—, —CH$_2$CH$_2$CH$_2$CH$_2$CH$_2$—, and —CH$_2$CH$_2$CH$_2$CH$_2$CH$_2$CH$_2$—. Among them, —CH$_2$CH$_2$—, —CH$_2$CH$_2$CH$_2$—, and —CH$_2$CH$_2$CH$_2$CH$_2$— are preferable from the viewpoint of availability of raw materials and reactivity and —CH$_2$CH$_2$CH$_2$— is more preferable.

It should be noted that in general formula (1) and general formula (2) of one or more embodiments, $R^2$s may be the same or may be different from each other, but are preferably the same.

In one or more embodiments, $R^3$s and $R^4$s in the above general formulas (1) and (2) each represent hydrogen, a monovalent hydrocarbon group having 1 to 20 carbon atoms, or an alkoxy group. Specific examples of the monovalent hydrocarbon group having 1 to 20 carbon atoms or the alkoxy group include a methyl group, an ethyl group, a propyl group, an isopropyl group, a butyl group, a sec-butyl group, a tert-butyl group, a pentyl group, a hexyl group, a 2-ethylhexyl group, a nonyl group, a decanyl group, a methoxy group, an ethoxy group, a propoxy group, an isopropoxy group, and a butoxy group.

It should be noted that in general formula (1) and general formula (2) of one or more embodiments, $R^3$s may be the same or may be different from each other, but are preferably the same, and $R^4$s may be the same or may be different from each other, but are preferably the same.

Among them, hydrogen or a methyl group is preferable from the viewpoint of reactivity, and hydrogen is further preferable when availability of raw materials is also taken into consideration.

In one or more embodiments, $R^5$s in the above general formulas (1) and (2) each represent hydrogen or a methyl group. When $R^5$ is hydrogen, the terminal functional group is an acryloyl group, and when $R^5$ is a methyl group, the terminal functional group is a methacryloyl group. It should be noted that in general formula (1) and general formula (2), $R^5$s may be the same or may be different from each other, but are preferably the same.

Either an acryloyl group or a methacryloyl group can be optionally selected depending on the combination with other compounding agents to be blended into the curable composition of one or more embodiments of the present invention. For example, when an acrylic acid ester-based monomer is added in order to decrease the viscosity of the curable composition of one or more embodiments of the present invention or adjust the physical properties of the cured product, if hydrogen is selected as $R^5$ in the above general formulas (1) and (2), the reactivity of each component becomes equal, and a cured product having a uniform composition is obtained. Thus, it is preferable that hydrogen be selected as $R^5$.

On the other hand, when a methacrylic acid ester-based monomer is added for the purpose of improving the physical properties of the cured product such as heat resistance, a methyl group is preferably selected as $R^5$ in the above general formulas (1) and (2) for the same reason.

However, since the combination of $R^5$s is optional, the combination is not limited to the above when it is preferable that each component of one or more embodiments of the present invention have different reactivities in order to achieve a specific purpose. That is, while hydrogen is selected as $R^5$ in the above general formula (1), a methyl group can be selected as $R^5$ in the above general formula (2), or a reverse combination may be employed.

In the above general formula (1) of one or more embodiments, n is an integer of 2 or greater. From the viewpoint of excellent rubber physical properties, durability, gel fraction, quick curing, productivity, etc., of the cured product, n is preferably 2 or 3, and n is further preferably 2 when availability of raw materials is also taken into consideration.

The molecular weights of the polymer (A) and the polymer (B) of one or more embodiments of the present invention are not particularly limited. However, from the viewpoint of fluidity, physical properties of the cured product, etc., the molecular weights of the polymer (A) and the polymer (B) are each 500 to 500,000 as a number-average molecular weight measured by size exclusion chromatography (SEC) based on polystyrene standards. The molecular weights of the polymer (A) and the polymer (B) are each preferably 500 to 200,000, further preferably 1,000 to 100,000, particularly preferably 3,000 to 50,000, and most preferably 5,000 to 30,000.

In one or more embodiments, the number-average molecular weight Mn(A) of the polymer (A) and the number-average molecular weight Mn(B) of the polymer (B) may be values close to each other. For example, the absolute value of the difference between Mn(A) and Mn(B) may be equal to or less than 20,000, may be equal to or less than 15,000, may be equal to or less than 10,000, may be equal to or less than 8,000, and may be equal to or less than 5,000. In addition, each of Mn(A) and Mn(B) may be equal to or less than 20,000, and may be equal to or less than 15,000.

Mn(A) and Mn(B) may have any of relationships of Mn(A)<Mn(B), Mn(A)=Mn(B), and Mn(A)>Mn(B). However, from the viewpoint of enhancing flexibility, vibration damping properties, recovery properties, etc., Mn(A)<Mn(B) or Mn(A)=Mn(B) is preferably satisfied. When flexibility is required while gas barrier properties and strength at break are maintained, Mn(A)>Mn(B) or Mn(A)=Mn(B) is preferably satisfied.

If the molecular weight is less than 500, physical properties that are characteristic of polyisobutylene may be less likely to be exhibited. Thus, it is not preferable that the molecular weight be less than 500. On the other hand, if the molecular weight is larger than 500,000, fluidity and processability are lacking, so that handling may be difficult. Thus, it is not preferable that the molecular weight be larger than 500,000.

A molecular weight distribution (a value represented by (weight-average molecular weight Mw)/(number-average molecular weight Mn) using a weight-average molecular weight Mw and a number-average molecular weight Mn measured by SEC based on polystyrene standards) of each of the polymer (A) and the polymer (B) of one or more embodiments of the present invention is within the range of 1.0 to 2.0, preferably within the range of 1.0 to 1.8, and further preferably within the range of 1.0 to 1.5, from the viewpoint of processing stability and ease of handling.

When the molecular weight distribution of the polymer (A) is denoted by $PDI_A$ and the molecular weight distribution of the polymer (B) is denoted by $PDI_B$, any of $PDI_A<PDI_B$, $PDI_A=PDI_B$, and $PDI_A>PDI_B$ may be satisfied. However, from the viewpoint of viscosity, handleability and ease of production of the curable composition, $PDI_A<PDI_B$ or $PDI_A>PDI_B$ is preferably satisfied, and $PDI_A<PDI_B$ is more preferably satisfied. In addition, the absolute value of the difference between $PDI_A$ and $PDI_B$ is, for example, preferably not less than 0 and not greater than 0.5, and more preferably not less than 0 and not greater than 0.4.

The method for producing the polymer (A) of one or more embodiments of the present invention is not particularly limited, but specific examples of the method include production methods described below.

(i) A method in which a polyisobutylene-based polymer is polymerized using a polymerization initiator having two or more reactive groups within one molecule, that is, a so-called multifunctional initiator, and the polymer end thereof is bonded to a (meth)acryloyl group.

(ii) A method in which a polyisobutylene-based polymer is polymerized using a polymerization initiator having a (meth)acryloyl group, and then polymer chains thereof are bonded together using a multivinyl-based compound such as divinylbenzene, or the like.

(iii) A method in which a monomer having a (meth)acryloyl group and a polymerizable functional group within one molecule is polymerized with isobutylene.

Each of these methods shown in (i) to (iii) is simple and can be suitably carried out. However, the method (i) is preferable since raw materials are easily available, a resin having a clear polymer structure is obtained in a simple manner, and this method is industrially easily carried out.

The method for producing the polymer (B) of one or more embodiments of the present invention is not particularly limited, but specific examples of the method include production methods described below.

(i) A method in which a polyisobutylene-based polymer is polymerized using a polymerization initiator having only one reactive group within one molecule, that is, a so-called monofunctional initiator, and the polymer end thereof is bonded to a (meth)acryloyl group.

(ii) A method in which a polyisobutylene-based polymer is polymerized using a polymerization initiator having a (meth)acryloyl group.

(iii) A method in which a monomer having a (meth)acryloyl group and a polymerizable functional group within one molecule is polymerized with isobutylene.

Each of the above methods is simple and can be suitably carried out. However, the method (i) is preferable since raw materials are easily available, a resin having a clear polymer structure is obtained in a simple manner, and this method is industrially easily carried out.

For the methods for producing the polymer (A) and the polymer (B) of one or more embodiments of the present invention, reference can be made to the production methods disclosed in WO 2013/047314 by the same applicant.

Specifically, a method, in which a polyisobutylene-based polymer skeleton is produced by living cationic polymerization of isobutylene in the presence of a Lewis acid catalyst such as $TiCl_4$ and an electron donor component such as a nitrogen-containing compound using monofunctional and multifunctional polymerization initiators and then the end of the polymer is functionalized using a phenoxyalkyl (meth)acrylate-based compound or the like, can be industrially suitably used from the viewpoint of availability of raw materials and productivity.

In Examples described later, an example, in which the polymer (A) and the polymer (B) are separately produced, isolated, and mixed when producing a composition, is disclosed for clarifying information about the obtained polymers.

However, in industrial production, the same method does not need to be necessarily carried out. Specifically, a multifunctional initiator for producing the polymer (A) and a monofunctional initiator for producing the polymer (B) are mixed and used, and are simultaneously reacted in one reaction vessel to produce the polymer (A) and the polymer (B). In industrial production, this method is preferable from the viewpoint of productivity and economic efficiency.

As a phenoxyalkyl (meth)acrylate-based compound for introducing a (meth)acryloyl group to the end of a polymer, 2-phenoxyethyl (meth)acrylate, 3-phenoxypropyl (meth)acrylate, 4-phenoxybutyl (meth)acrylate, 5-phenoxypentyl (meth)acrylate, 6-phenoxyhexyl (meth)acrylate, and the like can be suitably used from the viewpoint of availability of raw materials.

Among them, 2-phenoxyethyl (meth)acrylate, 3-phenoxypropyl (meth)acrylate, 4-phenoxybutyl (meth)acrylate are more preferable from the viewpoint of reactivity, 3-phenoxypropyl (meth)acrylate or 4-phenoxybutyl (meth)acrylate is further preferable, and 3-phenoxypropyl acrylate (phenoxypropyl acrylate) or 4-phenoxybutyl acrylate (phenoxybutyl acrylate) is particularly preferable.

The curable composition of one or more embodiments of the present invention contains a polymerization initiator (C) in addition to the polymer (A) and the polymer (B). The polymerization initiator (C) is contained in an amount of 0.001 to 50 parts by weight, preferably 0.001 to 20 parts by weight, more preferably 0.05 to 10 parts by weight, particularly preferably 0.1 to 5 parts by weight, and most preferably 0.3 to 3 parts by weight, per 100 parts by weight of the total weight of the polymer (A) and the polymer (B).

The polymerization initiator (C) is not particularly limited as long as it can polymerize the (meth)acryloyl groups of the polymer (A) and the polymer (B), and a radical polymerization initiator and an anionic polymerization initiator can be suitably used.

As the radical polymerization initiator, a compound that generates a radical species by light or heat can be suitably used in one or more embodiments.

The compound that generates a radical species by light (hereinafter, also simply referred to as photo radical polymerization initiator) is not particularly limited, and the polymerization initiators disclosed in WO 2013/047314 and Japanese Laid-Open Patent Publication No. 2013-216782 by the same applicant can be suitably used.

Among them, compounds having a hydroxyl group and a phenyl ketone structure, compounds having a benzophenone structure, and compounds having an acylphosphine oxide structure are preferable. Specifically, benzophenone, 3-methoxybenzophenone, 4-methylbenzophenone, 4,4'-bis(diethylamino)benzophenone, 4-chlorobenzophenone, 4,4'-dimethoxybenzophenone, 4-chloro-4'-benzylbenzophenone, 1-hydroxy-cyclohexyl-phenyl-ketone, 2-hydroxy-2-methyl-1-phenyl-propan-1-one, 2-benzyl-2-dimethylamino-1-(4-morpholinophenyl)-butanone-1, 2-methyl-1-[4-(methylthio)phenyl]-2-morpholinopropan-1-one, bis(2,4,6-trimethylbenzoyl)-phenylphosphine oxide, bis(2,6-dimethoxybenzoyl)-2,4,4-trimethylpentylphosphine oxide, and 2,4,6-trimethylbenzoyl-diphenyl-phosphine oxide are preferable.

Among them, in view of good curability and storage stability, benzophenone, 4,4'-bis(diethylamino)benzophenone, 2,2-dimethoxy-1,2-diphenylethane-1-one, 1-hydroxy-cyclohexyl-phenyl-ketone, 2-hydroxy-2-methyl-1-phenyl-propan-1-one, bis(2,6-dimethoxybenzoyl)-2,4,4-trimethylpentylphosphine oxide, 2,4,6-trimethylbenzoyl-diphenyl-phosphine oxide, bis(2,4,6-trimethylbenzoyl)-phenylphosphine oxide, and 2-methyl-1-[4-(methylthio)phenyl]-2-morpholinopropan-1-one are particularly preferable.

These initiators may be used individually, or two or more compounds selected from the group consisting of these initiators may be used in combination. Furthermore, the above compounds may be combined with other compounds. Specific examples of the combinations include a combination with an amine such as dimethanolmethylamine, dimethylethanolamine, and triethanolamine, a combination in addition to this with an iodonium salt such as diphenyliodonium chloride, and a combination with an amine and a pigment such as methylene blue.

In one or more embodiments, the photo radical polymerization initiator preferably includes a compound having an alkylphenone structure or a compound having an acylphosphine oxide structure, and more preferably includes a compound having an alkylphenone structure and a compound having an acylphosphine oxide structure. The compound having an alkylphenone structure is preferably one or more compounds selected from the group consisting of 1-hydroxy-cyclohexyl-phenyl-ketone, 2-hydroxy-2-methyl-1-phenyl-propan-1-one, 2-benzyl-2-dimethylamino-1-(4-morpholinophenyl)-butanone-1, and 2-methyl-1-[4-(methylthio)phenyl]-2-morpholinopropan-1-one, and is more preferably 2-hydroxy-2-methyl-1-phenyl-propan-1-one. The compound having an acylphosphine oxide structure is one or more compounds selected from the group consisting of bis(2,4,6-trimethylbenzoyl)-phenylphosphine oxide, bis(2,6-dimethoxybenzoyl)-2,4,4-trimethylpentylphosphine oxide, and 2,4,6-trimethylbenzoyl-diphenyl-phosphine oxide, and is more preferably bis(2,4,6-trimethylbenzoyl)-phenylphosphine oxide.

In one or more embodiments where the photo radical polymerization initiator is used, a polymerization inhibitor such as hydroquinone, hydroquinone monomethyl ether, benzoquinone, and p-tert-butyl catechol can also be added as necessary. The coexistence of these can be expected to have the effect of preventing unintentional curing of the curable composition and facilitating handling of the curable composition.

In one or more embodiments, the addition amount of the photo radical polymerization initiator is not particularly limited, but is preferably 0.001 to 50 parts by weight, more preferably 0.001 to 20 parts by weight, further preferably 0.05 to 10 parts by weight, particularly preferably 0.1 to 5 parts by weight, and most preferably 0.3 to 3 parts by weight, per 100 parts by weight of the total weight of the polymer (A) and the polymer (B). If the addition amount of the photo radical polymerization initiator is less than 0.001 parts by weight, sufficient curability may not be obtained. On the other hand, if the addition amount of the photo radical polymerization initiator is greater than 50 parts by weight, light does not reach the deep portions, so that an uncured layer may be formed at the bottom of the cured product, and the thick film curability may deteriorate, or the heat resistance of the cured product may decrease.

The method for curing the curable composition of one or more embodiments of the present invention is not particularly limited, but examples of the method include irradiation with light or an electron beam using a high pressure mercury lamp, a low pressure mercury lamp, an electron beam irradiation device, a halogen lamp, a light-emitting diode, a semiconductor laser, or the like, depending on the nature of a photo radical polymerization initiator to be used.

In one or more embodiments, the compound that generates a radical species by heat (hereinafter, also simply referred to as a thermal radical polymerization initiator) is not particularly limited, but an azo-based initiator, a peroxide initiator, a persulfate initiator, and a redox initiator are included.

Examples of suitable azo initiators include, but are not limited to, 2,2'-azobis(4-methoxy-2,4-dimethylvaleronitrile) (VAZO 33), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), 1,1-azobis(1-cyclohexanecarbonitrile) (VAZO 88) (all available from DuPont Chemical), 2,2'-azobis(2-cyclopropylpropionitrile), and 2,2'-azobis(methylisobutyrate) (V-601) (available from Wako Pure Chemical Industries, Ltd.).

Examples of suitable peroxide initiators include, but are not limited to, general commercial products such as benzoyl peroxide, acetyl peroxide, lauroyl peroxide, decanoyl peroxide, dicumyl peroxide, dicetyl peroxydicarbonate, t-butyl peroxy isopropyl monocarbonate, di(4-t-butylcyclohexyl) peroxydicarbonate (Perkadox 16S) (available from Akzo Nobel), di(2-ethylhexyl) peroxydicarbonate, t-butyl peroxypivalate (Lupersol 11) (available from Elf Atochem), and t-butyl peroxy-2-ethylhexanoate (Trigonox 21-C50) (available from Akzo Nobel).

Examples of suitable persulfate initiators include, but are not limited to, potassium persulfate, sodium persulfate, and ammonium persulfate.

Examples of suitable redox (oxidation and reduction) initiators include, but are not limited to, combinations of the above persulfate initiators with reducing agents such as sodium metabisulfite and sodium bisulfite; systems based on organic peroxides and tertiary amines such as a system based on benzoyl peroxide and dimethylaniline; and systems based on organic hydroperoxides and transition metals such as a system based on cumene hydroperoxide and cobalt naphthate.

Examples of other initiators include, but are not limited to, pinacols such as tetraphenyl 1,1,2,2-ethanediol.

Preferable thermal radical polymerization initiators are selected from the group consisting of azo-based initiators and peroxide initiators. More preferable thermal radical polymerization initiators are 2,2'-azobis(isobutyronitrile), 2,2'-azobis-2-methylbutyronitrile, t-butyl peroxypivalate, di(4-t-butylcyclohexyl) peroxydicarbonate, t-butyl peroxyisopropyl monocarbonate, dicumyl peroxide, benzoyl peroxide, and mixtures thereof.

In one or more embodiments, the addition amount of the thermal radical polymerization initiator is not particularly limited, but is 0.001 to 50 parts by weight, preferably 0.001 to 20 parts by weight, more preferably 0.05 to 10 parts by weight, further preferably 0.1 to 5 parts by weight, and particularly preferably 0.3 to 3 parts by weight, per 100 parts by weight of the total weight of the polymer (A) and the polymer (B).

If the addition amount of the thermal radical polymerization initiator is less than 0.001 parts by weight, sufficient curability may not be obtained. On the other hand, if the addition amount of the thermal radical polymerization initiator is greater than 50 parts by weight, insufficient mechanical properties or unintended foaming upon curing may occur.

The temperature and time for curing the curable composition of one or more embodiments of the present invention are not particularly limited, and vary depending on a thermal radical polymerization initiator to be used. However, normally, the temperature is preferably within the range of 50° C. to 250° C. and more preferably within the range of 70° C. to 200° C.

The curing time varies depending on a thermal radical polymerization initiator and additives to be used, reaction temperature, and the like, but is normally within the range of 1 minute to 5 hours.

In one or more embodiments, the photo radical polymerization initiator and the thermal radical polymerization initiator may be used individually, or may be used in combination as long as curing with the respective initiators is not inhibited. For example, in the step of irradiating a photocurable composition with UV light to obtain a cured product, a portion not irradiated with light may remain uncured. In such a case, it is preferable to use the thermal radical polymerization initiator in combination, because the uncured portion can also be cured by thermally treating the composition. Thus, the photo radical polymerization initiator and the thermal radical polymerization initiator can be used to supplement the own features with each other.

In addition, a compound that generates a radical species by a reaction with oxygen molecules can also be used in one or more embodiments. Examples of such a compound include trialkylboron compounds such as triethylboron. As an example, the following usage can be proposed. Specifically, a curable composition is prepared in an environment substantially free from the influence of oxygen, such as in a nitrogen or argon atmosphere, and sealed in a container capable of blocking oxygen. At the time of use, the curable composition is taken out from the above container and applied to a sealing portion or a coating portion to react with oxygen in the air, thereby obtaining a cured product.

Examples of the anionic polymerization initiator include, but are not limited to, n-butyllithium (including s-butyllithium and t-butyllithium), mixtures of Na-naphthalene, K-benzophenone, etc., and Grignard reagents.

Various additives may be added to the curable composition of one or more embodiments of the present invention for the purpose of adjusting various physical properties of the composition or the cured product as long as the advantageous effects of one or more embodiments of the present invention are not impaired.

Examples of such additives include polymerizable monomers and oligomers such as various (meth)acrylic acid ester-based compounds and aromatic vinyl-based compounds, photosensitive substances (compounds that cause a chemical change in molecular structure by the action of natural light and cause a change in physical properties such as curing) such as unsaturated (meth)acrylic-based compounds and polyvinyl cinnamate-based compounds, air oxidation curable substances such as drying oils, alkyd resins, and liquid conjugated diene resins, a tackifier, an adhesion promoter, a plasticizer, a filler, a mold release agent, a flame retardant, a radical polymerization inhibitor, a metal deactivator, a light stabilizer, an antiozonant, a UV absorber, an antioxidant, a lubricant, a pigment, and a foaming agent. These various additives may be used individually, or two or more of these various additives may be used in combination.

Specific examples of such additives include the additives disclosed in the respective specifications of WO 2013/047314, Japanese Laid-Open Patent Publication No. 2013-216782, WO 2007/069600, Japanese Examined Patent Publication No. H4-69659, Japanese Examined Patent Publication No. H7-108928, Japanese Laid-Open Patent Publication No. S63-254149, and Japanese Laid-Open Patent Publication No. S64-22904 by the same applicant, etc.

Meanwhile, according to the curing agent composition of one or more embodiments of the present invention, since the flexibility and the followability to deformation can be enhanced without using a plasticizer, the plasticizer can be reduced. By reducing the plasticizer, bleed-out of a compounding component can be more highly inhibited. The amount of the plasticizer per 100 parts by weight of the total of the polymer (A) and the polymer (B) is, for example, not greater than 200 parts by weight, preferably not greater than 100 parts by weight, more preferably not greater than 50 parts by weight, further preferably not greater than 30 parts by weight, and particularly preferably not greater than 10 parts by weight, and may be 0 parts by weight. In addition, the total amount of the polymer (A) and the polymer (B) in 100% by weight of the curing agent composition is, for example, not less than 10% by weight, preferably not less than 30% by weight, more preferably not less than 50% by weight, further preferably not less than 80% by weight, and particularly preferably not less than 90% by weight, and may be equal to or greater than 95% by weight.

The method for preparing the curable composition of one or more embodiments of the present invention is not particularly limited, but the curable composition may be prepared as a one-pack type containing all the compounding components together, or may be prepared as a two-pack type in which the compounding components are separately blended in advance in consideration of the storage stability of the composition and the like and then are mixed before use.

In the case of a one-pack type, an operation of mixing and kneading becomes unnecessary when applying, and any measurement errors (error in the mixing ratio) that may occur during the operation are also eliminated. Thus, errors such as poor curing can be prevented, and a one-pack type is most preferable. In the case of a two-pack type, the compounding components can be arbitrarily divided into two liquids which are to be mixed before use. As the method for dividing into a liquid A and a liquid B, various combinations can be employed in consideration of the mixing ratio, storage stability, the mixing method, pot life, and the like of the curable composition.

Furthermore, a three-pack type curable composition of one or more embodiments can be produced by preparing a third component in addition to the liquid A and the liquid B as necessary. Moreover, the compounding components can be divided even more as necessary. The method for mixing the composition of one or more embodiments of the present invention is not particularly limited. For example, the composition can be produced by blending the above-described components, shielding the blend from light as necessary, and kneading the blend using a hand mixer, a static mixer, a planetary mixer, a disperser, a roll, a kneader, a single-screw extruder, a twin-screw extruder, a Banbury mixer, a Brabender mixer, a high-shear mixer, or the like. Regarding the temperature during kneading, an ordinary method may be employed, such as kneading at ordinary temperature or under heating, or dissolving the components using a small amount of a suitable solvent and mixing the components.

The cured product obtained by radical curing of the curable composition of one or more embodiments of the present invention can be made into a rubber-like cured product, a resin-like cured product, or a gel-like cured product. The composition is characterized in that the halogen atom content thereof is extremely low, and the content of halogen atoms derived from the polyisobutylene-based polymer can be 10,000 ppm or less, preferably 5,000 ppm or less, and further preferably 1,000 ppm or less. In particular, in the case of producing the polymer (A) including the polymer of the above general formula (1) or the polymer (B) including the polymer of the above general formula (2), the reaction of introducing an acryloyl group to the polymer end proceeds with high efficiency, whereby the residual amount of halogen atoms possessed by the polymerization initiator is significantly reduced.

A conventionally known method for synthesizing a (meth) acryloyl-terminated polyisobutylene-based polymer is a method in which the (meth)acryloyl-terminated polyisobutylene-based polymer is produced from a chlorine-terminated polyisobutylene-based polymer through a multi-step reaction. Normally, functional group conversion efficiency and yield decrease in the multi-step reaction. On the other hand, in particular, for the polymers represented by the general formula (1) or the general formula (2), since the acryloyl group introduction reaction can be achieved in one step, high functional group conversion efficiency and yield can be simultaneously achieved. Thus, the polymers represented by the general formula (1) or the general formula (2) are preferable.

Since the content of halogen atoms in the polymer is low, the content of halogen atoms in the obtained cured product is also low, so that the cured product can be suitably used in applications in which containing halogen atoms is avoided.

The cured product of one or more embodiments of the present invention has excellent curability of the surface of the cured product, and has an excellent feature that a crosslinking reaction caused by active energy rays is less likely to be inhibited by oxygen or the like. Therefore, the cured product of one or more embodiments of the present invention has an excellent feature that an uncured layer is less likely to be formed on the surface of the cured product after light irradiation or heating-curing.

From the features described above, the curable composition and the cured product of one or more embodiments of the present invention can be used in the following applications. Specifically, examples of applications include various applications such as electric and electronic components, sealing materials, coating materials, adhesives, sealants, and molding components for medicines and medical supplies, sealing materials for electrolytic capacitors, resist materials, on-site forming gaskets, vibration-proof and vibration damping materials, sealing materials for double-layered glass, covering materials and sealing materials for electric wires, cables, and optical fibers, rollers, sheets, sealing materials, adhesives, pressure-sensitive adhesives, molded articles, paints, inks, foams, and materials for tires.

For specific examples of these applications, reference can be made to the statement of WO 2013/047314 and Japanese Laid-Open Patent Publication No. 2013-216782 by the same applicant.

The present application claims the benefit of priority to Japanese Patent Application No. 2017-030566 filed on Feb. 22, 2017. The entire contents of the specifications of Japanese Patent Application No. 2017-030566 filed on Feb. 22, 2017 are hereby incorporated by reference.

EXAMPLES

Hereinafter, one or more embodiments of the present invention will be described in more detail by means of examples. However, the present invention is not limited to these examples.

(Molecular Weight Measurement)

In the examples described below, "number-average molecular weight", "weight-average molecular weight", and "molecular weight distribution (ratio of the number-average molecular weight and the weight-average molecular weight)" were measured using size permeation chromatography (SEC) based on polystyrene standards. As a SEC system, LC Module 1 manufactured by Waters Corporation was used. As a GPC column (stationary phase), a column filled with a polystyrene crosslinked gel (Shodex GPC K-804 and GPC K-802.5, each manufactured by Showa Denko K.K.) was used. As a mobile phase, chloroform was used.

(Calculation of Functionalization Rate Fn)

The introduction number of (meth)acryloyl groups introduced to the end of the polymer (A) of one or more embodiments of the present invention was determined as follows. First, the number of protons of the methyl group derived from polyisobutylene contained in one molecule of the polymer was determined from the number-average molecular weight Mn of the polymer determined by the above molecular weight measurement (GPC measurement). Next, $^1$H NMR measurement was performed, and the introduction number of (meth)acryloyl groups within one molecule of the polymer was determined from the peak integration value of the vinyl proton derived from the (meth)acryloyl group when the proton number of the methyl group was the previously determined number.

The introduction number of (meth)acryloyl groups introduced into the polymer (B) was determined as follows. Specifically, through $^1$H NMR measurement, the introduction number of (meth)acryloyl groups within one molecule of the polymer was determined from the peak integration value of the vinyl proton derived from the (meth)acryloyl group with respect to the integration value of the proton derived from the used initiator (cumyl chloride in Preparation Example 2 described below).

(Evaluation of Tensile Properties)

A curable composition was applied onto a polyethylene sheet so as to have a thickness of 2 mm or 0.5 mm, and was irradiated with UV light for 20 seconds using an UV irradiation apparatus (model: LH6, manufactured by Fusion UV Systems Japan K.K.) (irradiation conditions: illuminance of 500 mW/cm$^2$ and light quantity of 2000 mJ/cm$^2$), thereby obtaining each sheet-like cured product.

According to JIS K-6251, a No. 7 dumbbell-shaped sample was punched out from the sheet and obtained as a test piece. A tensile test was conducted under a condition of a tensile rate of 200 mm/min to evaluate modulus, tensile strength, and breaking elongation.

(Hardness)

According to JIS K-6352, three sheets each having a thickness of 2 mm were stacked and the hardness was measured.

(Gel Fraction)

About $W_1$ (g) of the cured product obtained in each of the examples and comparative examples described below was weighed out, immersed in toluene (in an amount of about 200 times that of W), and allowed to stand at 70° C. for 48 hours. After cooling to room temperature, the precipitate was collected by filtration and dried at 80° C. under reduced pressure for 24 hours. The weight $W_2$ (g) of the solid content thus obtained was measured, and the gel fraction was determined by the following calculation equation.

Calculation equation: Gel fraction (%)=$W_2/W_1 \times 100$ (Measurement of Oxygen Permeability Coefficient)

The oxygen permeation coefficient was measured by a differential pressure method using a sheet-like cured product having a thickness of 0.5 mm according to JIS K-7126, and was used as an index to gas barrier properties. In the measurement, a gas permeability measuring device GTR-100 GW/30X (manufactured by GTR TEC Corporation) was used.

(Heat Resistance: Presence/Absence of Bleed-Out)

The cured products obtained in the examples and comparative examples described below were aged at 150° C. for 3 days, and then cooled to room temperature. The surface of each cured product was scraped off using a spatula, and whether adhesion of a liquid component to the spatula was observed or not was checked to confirm presence/absence of bleed-out from the cured product. Absence of bleed-out indicates that the cured product has excellent heat resistance. On the other hand, presence of bleed-out indicates that the cured product has inferior heat resistance.

(Vibration Damping Properties)

According to JIS K-6394, the dynamic viscoelasticity was measured while raising the temperature at 4° C./min in the range of –70° C. to 270° C. in a shear mode at a frequency of 10 Hz and a strain of 0.05%. The numerical value of tan δ at 20° C. was used as an index to vibration damping properties.

(Recovery Properties)

A test piece of 4 cm×1 cm was cut out from a 0.5 mm-thick sheet-like cured product. The test piece was stretched until the length of the test piece became 8 cm from 4 cm, then the strain was released, and the time taken for the test piece to return to the original length (4 cm) was measured. If the test piece recovers instantaneously when the strain is released, following deformation is considered to be insufficient. This is not preferable because, even if the curable composition is applied to a substrate and used, an excess load is applied to the curable composition and the cured product and thus the cured product may be peeled off the substrate or may be broken. On the other hand, if the test piece exhibits behavior of slowly returning to the original length after the strain is released, the test piece has excellent stress relaxation, and the curable composition can be suitably used as a sealing agent, a pressure-sensitive adhesive, or the like. Therefore, in this test, a longer time to return to the original deformation was considered to be preferable.

(Production Example 1) Synthesis of Phenoxypropyl Acrylate (End Functionalizing Agent)

Phenoxypropyl bromide (100 g, 465 mmol), potassium acrylate (66.6 g, 604 mmol), N,N-dimethylacetamide (465 ml, 1 mol/L) were mixed at room temperature and stirred at room temperature for 48 hours. Next, the mixture was further stirred at 90° C. for 48 hours. Thereafter, the reaction mixture was cooled to room temperature, and deionized water (1162 ml) and butyl chloride (1162 ml) were added thereto, followed by thorough mixing. Then, the mixture was allowed to stand, thereby separating the organic phase and the aqueous phase. The separated aqueous phase was extracted three times with butyl chloride (325 ml), and the extracts were combined with the previous organic phase. The organic phase thus obtained was washed seven times with deionized water (1162 ml), and then was dried with magnesium sulfate. The precipitate was separated by filtration, and the filtrate was evaporated under reduced pressure to obtain phenoxypropyl acrylate as a colorless transparent liquid (91 g, 95%).

(Production Example 2) [Production of Polymer (A)]

A vessel that was a 500 mL separable flask was purged with nitrogen, then 25 mL of n-hexane (dried over molecular sieves) and 225 mL of butyl chloride (dried over molecular sieves) were added, and the mixture was cooled to –70° C. with stirring under a nitrogen atmosphere. Next, 120 mL (1.27 mol) of isobutylene, 1.72 g (0.00744 mol) of p-dicumyl chloride, and 0.24 ml (0.0017 mol) of triethylamine were added to prepare a reaction mixture. The reaction mixture was cooled to –73° C., and then 1.22 mL (0.0112 mol) of titanium tetrachloride was added to initiate polymerization. After the initiation of polymerization, the concentration of residual isobutylene was measured by gas chromatography, and polymerization of isobutylene was terminated when 99.9% or more of the added isobutylene was consumed. Next, 4.92 g (0.0223 mol) of the phenoxypropyl acrylate synthesized in Production Example 1 and 6.53 mL (0.0595 mol) of titanium tetrachloride were added, and stirring was further continued at −75 to −80° C. for 3 hours, thereby carrying out a functionalization reaction. After end of the reaction, the catalyst was deactivated by pouring the reaction mixture into a large amount of methanol. The solvent consisting mainly of methanol, butyl chloride, and n-hexane was removed to obtain a viscous precipitate. The precipitate was dissolved in 650 g of butyl chloride (solid content concentration: 10.5%), 14.5 g of powdered activated carbon (product name "Taiko A", manufactured by Futamura Chemical Co., Ltd.) was added, and the mixture was stirred overnight at room temperature. The activated carbon was filtered out, 0.0152 g of 4-methoxyphenol was added to the obtained filtrate, and the solvent was evaporated under reduced pressure to obtain a polyisobutylene-based polymer (A) having acryloyl groups at both ends (hereinafter, referred to as polymer (P-1)). The number-average molecular weight Mn (based on polystyrene standards) of the polymer (P-1) was 11,863, the molecular weight distribution Mw/Mn of the polymer (P-1) was 1.2, and the number of acryloyl groups introduced per molecule of the polymer (P-1) was 1.8.

(Production Example 3) [Production of Polymer (B)]

A vessel that was a 1 L separable flask was purged with nitrogen, then 58 mL of n-hexane (dried over molecular sieves) and 525 mL of butyl chloride (dried over molecular sieves) were added, and the mixture was cooled to −70° C. with stirring under a nitrogen atmosphere. Next, 200 mL (2.12 mol) of isobutylene, 1.79 g (0.0115 mol) of cumyl chloride, and 0.32 ml (0.0023 mol) of triethylamine were added to prepare a reaction mixture. The reaction mixture was cooled to −73° C., and then 1.14 mL (0.0104 mol) of titanium tetrachloride was added to initiate polymerization. After the initiation of polymerization, the concentration of residual isobutylene was measured by gas chromatography, and polymerization of isobutylene was terminated when 99.9% or more of the added isobutylene was consumed. Next, 3.81 g (0.0173 mol) of the phenoxypropyl acrylate synthesized in Production Example 1 and 5.06 mL (0.0462 mol) of titanium tetrachloride were added, and stirring was further continued at −75 to −80° C. for 3 hours, thereby carrying out a functionalization reaction. After end of the reaction, the catalyst was deactivated by pouring the reaction mixture into a large amount of methanol. The solvent consisting mainly of methanol, butyl chloride, and n-hexane was removed to obtain a viscous precipitate. The precipitate was dissolved in 1000 g of butyl chloride (solid content concentration: 11.7%), 20 g of powdered activated carbon (product name "Taiko A", manufactured by Futamura Chemical Co., Ltd.) was added, and the mixture was stirred overnight at room temperature. The activated carbon was filtered out, 0.0265 g of 4-methoxyphenol was added to the obtained filtrate, and the solvent was evaporated under reduced pressure to obtain a polyisobutylene-based polymer (B) having an acryloyl group at one end (hereinafter, referred to as polymer (P-2)). The number-average molecular weight Mn (based on polystyrene standards) of the polymer (P-2) was 12,080, the molecular weight distribution Mw/Mn of the polymer (P-2) was 1.5, and the number of acryloyl groups introduced per molecule of the polymer (P-2) was 0.9.

(Production Example 4) Preparation of Polymerization Initiator (C)

20 parts by weight of DAROCUR 1173 (2-hydroxy-2-methyl-1-phenyl-propan-1-one, manufactured by Ciba Japan K.K.) and 10 parts by weight of IRGACURE 819 (bis(2,4,6-trimethylbenzoyl)-phenylphosphine oxide, manufactured by Ciba Japan K.K.) were weighed out and mixed well for 5 minutes using a spatula, to prepare a polymerization initiator (C) (hereinafter, referred to as polymerization initiator mixture (R-1)).

Example 1

The polymer (P-1) and the polymer (P-2) were weighed out to the parts by weight described in Table 1 and dissolved in hexane, and then 200 ppm of 4-methoxyphenol (manufactured by Wako Pure Chemical Industries, Ltd.) was added to obtain a solution having a solid content of 20%. Next, the hexane was evaporated under reduced pressure, thereby obtaining a resin mixture containing the polymer (P-1) and the polymer (P-2). The resin mixture as a polymer mixture, the polymerization initiator mixture (R-1) as a polymerization initiator (C), and AO-50 (manufactured by Adeka Corporation) as an antioxidant were added according to the parts by weight described in Table 1 and mixed for 5 minutes using a spatula, and then the mixture was degassed to obtain a curable composition. Thereafter, this curable composition was applied onto a polyethylene sheet so as to have a thickness of 0.5 mm and 2 mm, and was irradiated with UV light for 20 seconds using an UV irradiation apparatus (model: LH6, manufactured by Fusion UV Systems Japan K.K.) (irradiation conditions: illuminance of 500 mW/cm$^2$ and light quantity of 2000 mJ/cm$^2$), thereby obtaining sheet-like cured products having a thickness of 0.5 mm and a thickness of 2 mm, respectively. Various physical properties of the cured products were as described in Table 1.

Example 2

A polymer mixture was prepared such that the amounts of the polymer (P-1) and the polymer (P-2) were the parts by weight described in Table 1, and sheet-like cured products having a thickness of 0.5 mm and a thickness of 2 mm, respectively, were obtained in the same manner as Example 1, except that the polymerization initiator mixture (R-1) and the antioxidant were used according to the parts by weight described in Table 1. Various physical properties of the cured products were as described in Table 1.

Example 3

A polymer mixture was prepared such that the amounts of the polymer (P-1) and the polymer (P-2) were the parts by weight described in Table 1, and sheet-like cured products having a thickness of 0.5 mm and a thickness of 2 mm, respectively, were obtained in the same manner as Example 1, except that the polymerization initiator mixture (R-1) and the antioxidant were used according to the parts by weight described in Table 1. Various physical properties of the cured products were as described in Table 1.

Comparative Example 1

Sheet-like cured products having a thickness of 0.5 mm and a thickness of 2 mm, respectively, were obtained in the same manner as Example 1, except that the polymer (P-1), the polymerization initiator mixture (R-1), and the antioxidant were used according to the parts by weight described in Table 1 and the polymer (P-2) was not used. Various physical properties of the cured products were as described in Table 1.

Comparative Example 2

A polymer mixture was prepared such that the amounts of the polymer (P-1) and the polymer (P-2) were the parts by weight described in Table 1, and sheet-like cured products having a thickness of 0.5 mm and a thickness of 2 mm, respectively, were obtained in the same manner as Example 1, except that the polymerization initiator mixture (R-1) and the antioxidant were used according to the parts by weight described in Table 1. Various physical properties of the cured products were as described in Table 1.

Comparative Example 3

Sheet-like cured products having a thickness of 0.5 mm and a thickness of 2 mm, respectively, were obtained in the same manner as Example 1, except that the polymer (P-1), a polybutene-based plasticizer (product name "Polybutene 100R", manufactured by Idemitsu Kosan Co., Ltd.), the polymerization initiator mixture (R-1), and the antioxidant were used according to the parts by weight described in Table 1 and the polymer (P-2) was not used. Various physical properties of the cured products were as described in Table 1.

decreased significantly (oxygen permeability increased significantly). From this, it is found that it was difficult to achieve both flexibility and gas barrier properties of the conventional curable composition at desired levels. On the other hand, in the cured products of Examples 1 to 3, the gas barrier properties did not decrease even when the flexibility was increased. From this, it is found that the curable compositions of these examples can have both desired flexibility and desired gas barrier properties.

Furthermore, the cured product of Comparative Example 3 had a low gel fraction. This indicates that the plasticizer component is not incorporated into the curing system, which causes bleed-out, as described below.

Next, whereas, in the cured product of Comparative Example 3 in which the plasticizer was blended, bleed-out of the oily component was observed after aging for heat resistance for 3 days at 150° C., such bleed-out was not observed in the cured products of Examples 1 to 3, and it is found that the cured products of Examples 1 to 3 can have both desired flexibility and desired heat resistance.

Next, by comparing the values of tan δ at 20° C., it is found that the cured products of the examples also have excellent vibration damping properties. That is, in Comparative Example 1 which does not contain the polymer (P-2) and Comparative Example 2 in which the content of the polymer (P-2) is low, the value of δ at 20° C. is less than 0.5, and thus it is found that the vibration damping properties are inferior. On the other hand, as shown in Examples 1 to 3, in the cured product of one or more embodiments of the present

TABLE 1

| | | Example 1 | Example 2 | Example 3 | Comparative Example 1 | Comparative Example 2 | Comparative Example 3 |
|---|---|---|---|---|---|---|---|
| Compounding (parts by weight) | Polymer (P-1) | 100 | 100 | 100 | 100 | 100 | 100 |
| | Polymer (P-2) | 43 | 100 | 233 | | 11 | |
| | Polymerization initiator mixture (R-1) | 0.72 | 1.00 | 1.67 | 0.5 | 0.56 | 0.5 |
| | Antioxidant (AO-50) | 1.43 | 2 | 3.33 | 1 | 1.11 | 1 |
| | Plasticizer (polybutene oil 100R) | | | | | | 43 |
| Physical properties of the cured product | Modulus at 30% elongation (MPa) | 0.2 | 0.13 | 0.074 | 0.37 | 0.31 | 0.094 |
| | Modulus at 50% elongation (MPa) | 0.28 | 0.17 | 0.098 | 0.53 | 0.44 | 0.13 |
| | Modulus at 100% elongation (MPa) | 0.46 | 0.28 | 0.15 | 0.87 | 0.72 | 0.21 |
| | Strength at break (MPa) | 0.79 | 0.59 | 0.6 | 0.89 | 0.81 | 0.32 |
| | Elongation at break (%) | 173 | 228 | 328 | 102 | 113 | 151 |
| | Hardness (JIS A) | 27 | 22 | 20 | 34 | 32 | 25 |
| | Gel fraction (% by weight) | 90 | 88.1 | 84.2 | 95.3 | 94.8 | 68 |
| | Oxygen permeability coefficient ($\times 10^{-16}$ mol · m/m$^2$ · sec · Pa) | 1.85 | 1.86 | 1.88 | 1.85 | 1.86 | 4.38 |
| | Heat resistance (Presence/Absence of Bleed-out) | Absence | Absence | Absence | Absence | Absence | Presence |
| | Vibration damping properties (tan δ at 20° C.) | 0.50 | 0.57 | 0.67 | 0.41 | 0.42 | 0.69 |
| | Recovery properties (second) | — | 7 | 12 | 2 | — | 3 |

The cured products shown in Examples 1 to 3 have a low modulus, a low hardness, and high extensibility as compared to the cured products of Comparative Examples 1 and 2, and thus are found to be cured products having excellent flexibility.

When the results of Comparative Example 3, in which the plasticizer (polybutene oil) was blended in order to exhibit flexibility, and the results of Examples 2 and 3 are compared to each other, the cured products of these examples have moduli similar to those of Comparative Example 3 but are found to be cured products having excellent strength at break.

Moreover, it is found that, when the plasticizer was used in Comparative Example 3, the gas barrier properties invention, the value of tan δ at 20° C. exceeds 0.5, and thus the cured product of one or more embodiments of the present invention is found to be a cured product having excellent vibration damping properties.

Next, using the cured product of Comparative Example 3 and the cured products of Examples 2 and 3 having extension moduli close to that of the cured product of Comparative Example 3, the recovery behavior of each cured product was examined. As a result, whereas the cured product of Comparative Example 3 took only 3 seconds to recover to the original shape, the cured product of Examples 2 and 3 took 7 to 12 seconds. From this, it is found that the cured product of one or more embodiments of the present invention has excellent stress relaxation properties and recovery properties at the time of deformation and exhibits excellent followability to deformation.

Example 4, Comparative Examples 4 and 5

Sheet-like cured products having a thickness of 0.5 mm and a thickness of 2 mm, respectively, were obtained in the same manner as Example 1, except that the polymer (P-1), the polymer (P-2), the polymerization initiator mixture (R-1), and the antioxidant were used according to the parts by weight described in Table 2. Various physical properties of the cured products were as described in Table 1.

TABLE 2

|  |  | Example 4 | Comparative Example 4 | Comparative Example 5 |
|---|---|---|---|---|
| Compounding (parts by weight) | Polymer (P-1) | 100 | 100 | 0 |
|  | Polymer (P-2) | 900 | 1300 | 100 |
|  | Polymerization initiator mixture (R-1) | 5.00 | 7.00 | 0.50 |
|  | Antioxidant (AO-50) | 10.0 | 14.0 | 1.00 |
|  | Plasticizer (polybutene oil 100R) |  |  |  |
| Physical properties of the cured product | Modulus at 30% elongation (MPa) | 0.034 | 0.027 | 0.005 |
|  | Modulus at 50% elongation (MPa) | 0.034 | 0.027 | 0.006 |
|  | Modulus at 100% elongation (MPa) | 0.041 | 0.023 | 0.010 |
|  | Strength at break (MPa) | 0.352 | 0.252 | 0.035 |
|  | Elongation at break (%) | 608 | 782 | 591 |
|  | Recovery properties (second) | 197 | >3,600 | >3,600 |

From the results of Example 4, it is found that the curable composition of Example 4 is a cured product having excellent flexibility and followability to deformation (recovery properties). On the other hand, from the results of Comparative Examples 4 and 5, it is found that when the proportion of the polymer (B) is too high, flexibility is exhibited but the recovery properties are inferior. Specifically, with the curable compositions of Comparative Example 4 and Comparative Example 5, even when one hour had passed after release of strain, the original size was not restored, and permanent strain was confirmed. That is, the curable composition in which the proportion of the polymer (B) is too high has poor followability to deformation.

From the above-described results, according to one or more embodiments of the present invention, it is found that a curable composition that has excellent flexibility strength, gas barrier properties, and vibration damping properties, that causes no bleed-out of a compounding agent component, and that has excellent followability to deformation, is provided.

Although the disclosure has been described with respect to only a limited number of embodiments, those skilled in the art, having benefit of this disclosure, will appreciate that various other embodiments may be devised without departing from the scope of the present invention. Accordingly the scope of the present invention should be limited only by the attached claims.

What is claimed is:

1. A curable composition, comprising:
   100 parts by weight of a polyisobutylene-based polymer (A) having 1.2 or more (meth)acryloyl groups per molecule;
   15 to 900 parts by weight of a polyisobutylene-based polymer (B) having 0.5 to 1.0 (meth)acryloyl group per molecule; and
   0.001 to 50 parts by weight, per 100 parts by weight of the total weight of the polymer (A) and the polymer (B), of a polymerization initiator (C),
   wherein each of the polymer (A) and the polymer (B) have a number average molecular weight of 500 to 500,000 as measured by size exclusion chromatography based on polystyrene standards, and a molecular weight distribution (weight-average molecular weight Mw)/(number-average molecular weight Mn) of 1.0 to 2.0,
   wherein the polymer (A) includes one or more selected from the group consisting of polymers represented by the following general formulas (1) and (3) to (6):

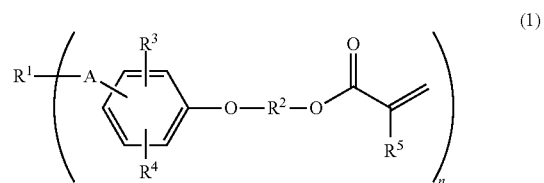

(1)

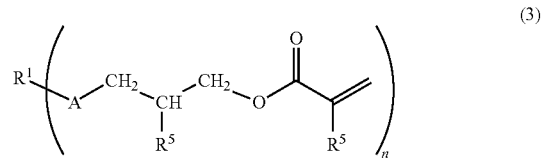

(3)

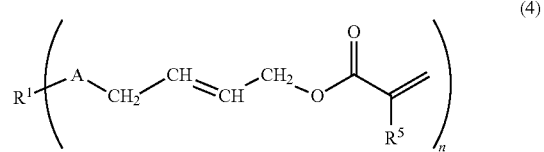

(4)

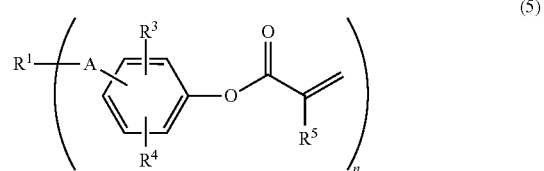

(5)

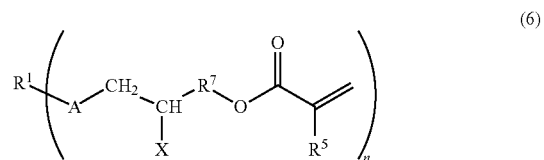

(6)

where, independently, $R^1$ represents a divalent or higher alkyl-substituted benzene having a free valence at the benzylic position or a divalent or higher-valent alkylene group having 4 to 20 carbon atoms and a free valence on a tertiary carbon, A represents a polyisobutylene-based polymer, $R^2$ represents a divalent saturated hydrocarbon group having 2 to 6 carbon atoms and containing no heteroatoms, $R^3$ and $R^4$ each represent hydrogen, a monovalent hydrocarbon group having 1 to 20 carbon atoms, or an alkoxy group, $R^5$ represents hydrogen or a methyl group, and n represents an integer of 2 or greater, and the polymer (B) includes one or more selected from the group consisting of polymers represented by the following general formulas (2) and (7) to (10):

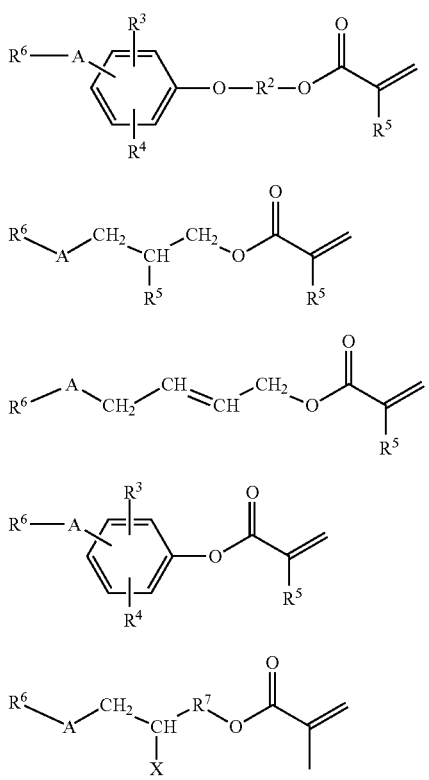

where, independently, $R^6$ represents a cumyl group, a 4-tert-butyl-cumyl group, a 4-methyl-cumyl group, a 4-methoxy-cumyl group, a 1-phenylethyl group, or an alkyl group having 4 to 20 carbon atoms and a free valence on tertiary carbon, A represents a polyisobutylene-based polymer, $R^2$ represents a divalent saturated hydrocarbon group having 2 to 6 carbon atoms and having no hetero atoms, $R^3$ and $R^4$ each represent hydrogen, a monovalent hydrocarbon group having 1 to 20 carbon atoms, or an alkoxy group, and $R^5$ represents hydrogen or a methyl group.

2. The curable composition according to claim 1, wherein the (meth)acryloyl groups are positioned at the ends of the polymer chain of polymer (A).

3. The curable composition according to claim 1, wherein the (meth)acryloyl group is positioned at one end of the polymer chain of polymer (B).

4. The curable composition according to claim 1, wherein the polymer (A) includes a polymer of the general formula (1), and the polymer (B) includes a polymer of the general formula (2).

5. The curable composition according to claim 1, wherein $R^2$ of the polymer (A) is a divalent saturated hydrocarbon group selected from the group consisting of —$CH_2CH_2$—, —$CH_2CH_2CH_2$—, and —$CH_2CH_2CH_2CH_2$—.

6. The curable composition according to claim 1, wherein $R^2$ of the polymer (B) is a divalent saturated hydrocarbon group selected from the group consisting of —$CH_2CH_2$—, —$CH_2CH_2CH_2$—, and —$CH_2CH_2CH_2CH_2$—.

7. The curable composition according to claim 1, wherein $R^3$ and $R^4$ in both the polymer (A) and the polymer (B) each represent hydrogen.

8. The curable composition according to claim 1, wherein n in the polymer (A) is 2.

9. The curable composition according to claim 1, wherein the polymerization initiator (C) is a radical polymerization initiator or an anionic polymerization initiator.

10. The curable composition according to claim 9, wherein the polymerization initiator (C) is a photo radical polymerization initiator capable of generating a radical species by light.

11. A cured product obtained by radical curing of the curable composition according to claim 1 with active energy rays.

* * * * *